US007016425B1

(12) United States Patent
Kraiem (10) Patent No.: US 7,016,425 B1
(45) Date of Patent: Mar. 21, 2006

(54) QUASI-DIFFERENTIAL MODULATION/DEMODULATION METHOD FOR MULTI-AMPLITUDE DIGITAL MODULATED SIGNALS AND OFDM SYSTEM

(75) Inventor: Besma Kraiem, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/482,769

(22) Filed: Jan. 13, 2000

(30) Foreign Application Priority Data

Jan. 15, 1999 (EP) ................................. 99100737

(51) Int. Cl.
*H04L 5/12* (2006.01)
(52) U.S. Cl. ...................... 375/261; 375/281; 375/298; 375/308; 375/283; 375/320; 375/331; 370/206; 370/215; 329/304; 332/103
(58) Field of Classification Search ................ 375/261, 375/242, 283, 300, 302, 329, 353, 377, 98, 375/118, 12, 14, 15, 39, 101, 279, 298, 308, 375/280, 281, 260, 330, 331, 320; 370/206, 370/215; 329/304; 332/103
See application file for complete search history.

(56) References Cited

U.S. PATENT DOCUMENTS

| 4,683,578 A | 7/1987 | Betts et al. | |
|---|---|---|---|
| 5,771,224 A * | 6/1998 | Seki et al. | ................... 370/206 |
| 2003/0039322 A1 * | 2/2003 | Murakami et al. | .......... 375/329 |

FOREIGN PATENT DOCUMENTS

| DE | 195 40 250 | 2/1997 |
|---|---|---|
| EP | 0 729 250 | 8/1996 |
| EP | 0 734 132 | 9/1996 |
| EP | 0 869 649 | 10/1998 |

OTHER PUBLICATIONS

DVB Document A037 ("Implementation Guideline For DVB-T Transmission Aspects" Digital Video Broadcasting, Mar. 1998,.*
Horvath et al. ("A Novel, High-Speed, Reconfigurable Demapper-Symbol Deinterleaver Architecture For DVB-T", Circuits and Systems, 1999. ISCAS '99. Proceedings of the 1999 IEEE International Symposium on , vol.: 4, Jul. 1999, pp. IV-382:IV-385).*
Berrou, Claude and Cobelles, Pierre ("Digital Television: Hierarchical Channel Coding Using Turbo-Codes" IEEE ICC 94, May 1, 1994, pp. 1255-1259).*
Moriyama S et al.: "Digital Transmission of High Bit Rate Signals Using 16DAPSK-OFDM Modulation Scheme" IEEE Transactions on Broadcasting, Mar. 1998, vol. 44, No. 1, pp. 115-122, XP002105431.

* cited by examiner

*Primary Examiner*—Jean B. Corrielus
*Assistant Examiner*—Guillermo Munoz
(74) *Attorney, Agent, or Firm*—Frommer Lawrence & Haug LLP; William S. Frommer; Darren M. Simon (57) ABSTRACT

The invention proposes the separate processing of the phase and amplitude of multi-amplitude digital modulation techniques, such as a QAM. The phases are differentially modulated and the amplitudes coherently processed. Also proposed is a method to correct the amplitude distortion of the symbols on each subcarrier, either from the QAM signal itself or from any PSK signal, if available. The invention shows that differential modulation/demodulation of multi-amplitude signals with no equidistant phases such as QAM is possible. Complex equalizer means to perform a channel estimation is no more needed as for coherent systems. Further, no pilot sucarriers are needed, thus the bandwidth efficiency is much higher. Furthermore, the frequency snychronization of differential demodulated signals is less complex. An implementation proposal of the new modulation/demodulation technique is described.

5 Claims, 14 Drawing Sheets

QUASI-DIFFERENTIAL MODULATION/DEMODULATION METHOD FOR MULTI-AMPLITUDE DIGITAL MODULATED SIGNALS AND OFDM SYSTEM

The invention relates to a modulation/demodulation method for multi-amplitude digital modulated signals with non-equidistant phases transmitted via an orthogonal frequency division multiplexing (OFDM) communication channel and also refers to an OFDM system for the transmission of information by multi-amplitude digital modulated signals from a transmitter to a receiver via a radio channel.

Orthogonal frequency division multiplexing (OFDM) has gained increasing interest in wireless communication systems during the last years, in particular for DAB (Digital Audio Broadcast) and DVB-T (Digital Video Broadcast Television). It has been considered for transmitting high data rate over frequency selective radio channels.

The principle of OFDM transmission technique is to devise an available bandwidth into several subchannels with smaller bandwidths. Thus the symbol length increases and the inter symbol interference (ISI) is combated. On the other hand, each subchannel is considered to be frequency non-selective. The amplitude and phase distortion caused by multipath effects is accordingly described by one factor.

In coherent transmission systems that distortion is removed by channel estimation. For this purpose known symbols are sent on pilot subcarrier(s). On the receiver side the amount of channel distortion is processed from the received known symbols and is used to correct the rest of the data before demodulation.

Channel estimation is not required, if differential modulation is used. The information is encoded in the ratio of successive symbols on the same subcarrier. Thus, the channel distortion is cancelled at the receiver, since it is assumed to be constant during successive OFDM symbols.

However, differential modulation and demodulation have been only described for low-order single-amplitude modulation schemes, such as PSK (Phase-Shift Keying) and QPSK (Quadrature Phase-Shift Keying). As for a specific example, reference is made to document DE 195 40 250 C1 describing a demodulation scheme based on the assumption that the demodulated complex symbols are associated to respectively transmitted symbols via a rotational symmetric constellation diagram so that approximative estimations for the phase-shift lead to applications with reasonable results.

For multi-amplitude signals such as QAM (Quadrature Amplitude Modulation) only coherent modulation is used, and thus channel estimation is always required (see e.g. EP 0 734 132 A2).

It is an object of the present invention to teach a more simple modulation/demodulation method and system for multi-amplitude digital modulated signals with non-equidistant phases, in particular QAM signals transmitted via an OFDM communication channel without the necessity of using pilot carriers.

According to the teaching and the characterizing features of claim 1, this problem is solved with the idea that the amplitudes of said digital modulated signals should be separately and coherently processed, whereas for the phases of respectively subsequent symbols on the same subcarrier differential modulation and demodulation is provided.

Advantageous details, improvements and embodiments are the subject of dependent claims.

An orthogonal frequency division multiplexing (OFDM) system for the transmission of information by multi-amplitude digital modulated signals from a transmitter to a receiver via a radio channel in accordance with the invention is the subject-matter of and defined in claim 9. Specific embodiments and advantageous supplements and improvements are defined in further dependent claims.

For a comprehensive explanation of the invention the following description is devided in chapters.

In Chapter I the OFDM transmission model used for simulations and the channel models are first described.

In Chapter II the simulation of coherent modulated 16 QAM is presented.

In Chapter III the principle of the combined coherent/differential (henceforward called quasi-differential) modulation for 16 QAM signals is described as well as the way it was implemented according to a best mode presently known.

In Chapter IV the simulation results of both techniques are compared in terms of BER (Bit Error Rate) performance in an AWGN (Additive White Gaussian Noise) channel and in a multipath channel.

Finally as a Summary a brief comparison of both systems with respect to implementation complexity will conclude the present description of the invention.

In the following description reference will be made to the accompanying drawings in which

FIG. 10 shows constellation diagrams of received QPSK and 16 QAM signals at different stages with an assumed SNR (Signal-to-Noise Ratio) of 35 dB wherein FIG. 10A visualizes received QPSK signals in a multipath channel;

Chapter I: System Simulations

In order to evaluate both the coherent transmission scheme and the quasi-differential transmission scheme according to the invention in different environments a baseband simulation tool known under the tradename COSSAP has been used.

Figure 1:
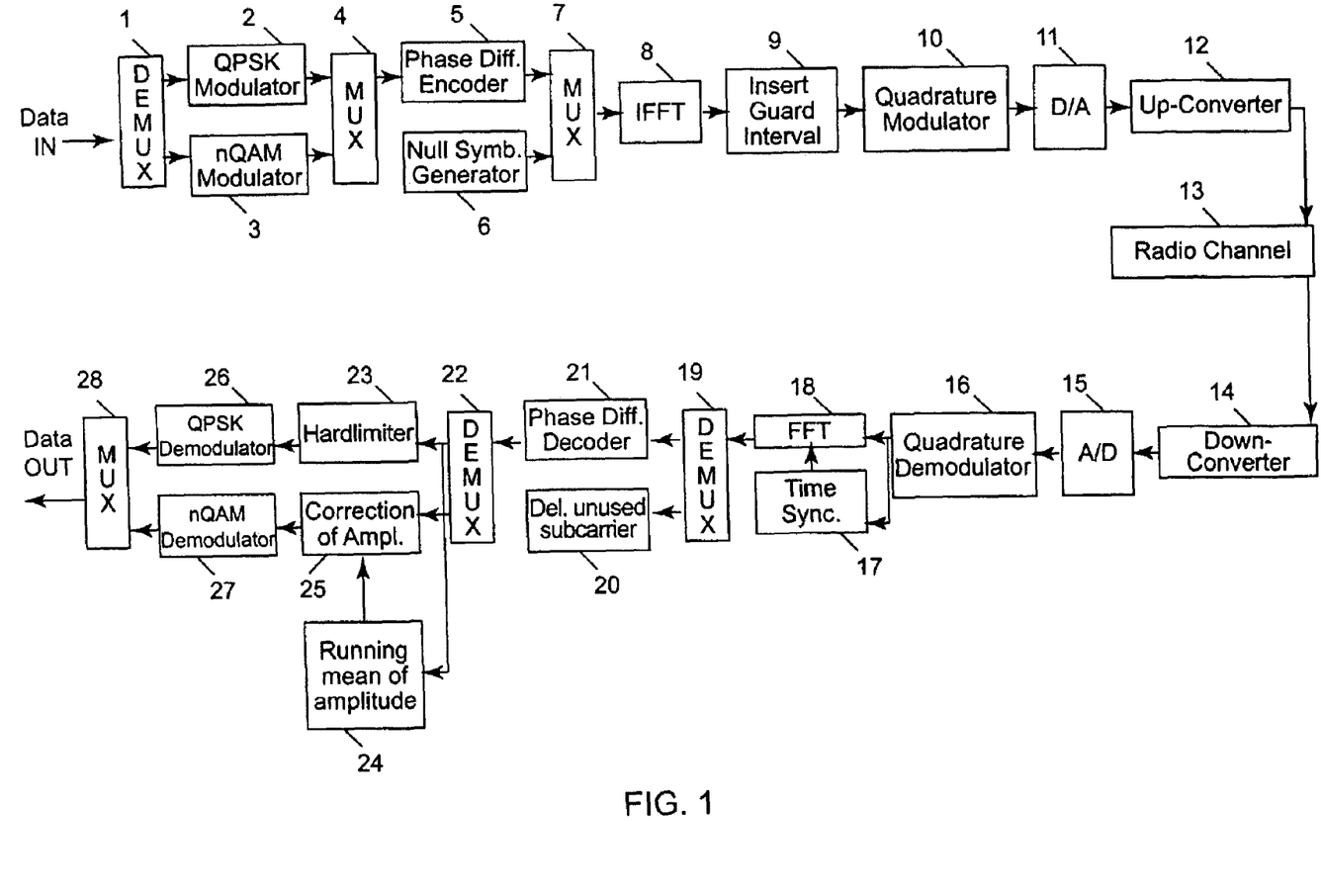
FIG. 1 is a block diagram of an OFDM system with features according to the invention.

The OFDM transmission model used for such simulations is shown in FIG. 1. Briefly, this OFDM system works as follows: The uncoded data stream is first modulated in 16 QAM symbols. Then ($N-N_{sel}$) virtual carriers (N=maximum carriers for FFT; $N_{sel}$=selected carriers) are inserted in the band edges of each OFDM symbol, since they are not used to transmit data. After IFFT (Inversed Fast Fourier Transformation) is processed, a guard interval is inserted at the beginning of each OFDM symbol, containing a copy of its last $N_G$ samples ($N_G$=Samples of guard length).

The blocks of FIG. 1 and their respective function are briefly described in the following:

| Reference Number: | Description and Function: |
|---|---|
| | Transmitter side (upper part of FIG. 1): |
| 1 | Demultiplexer: The adopted frame structure consists of n QPSK symbols followed by m 16 QAM symbols. Thus (n*2) bits are sent to the QPSK modulator 2, and (m*4) bits are supplied to a 16 QAM modulator 3. |
| 2 | QPSK Modulator: Mapping of 2 bits into QPSK complex symbols. |
| 3 | 16 QAM Modulator Mapping of 4 bits into 16 QAM complex symbols. |
| 4 | Multiplexer (MUX): Multiplexes QPSK and 16 QAM symbols into a frame, as shown in FIG. 6. |
| 5 | Phase-Differential Encoder: The phases of subsequent symbols on the same subcarrier are differentially modulated, whereas the amplitude is kept unchanged (see functional block diagram of FIG. 4). |
| 6 | Null Symbol Generator: The unused subcarriers at the band edges are set to zero. |
| 7 | MUX: The data and null symbols are multiplexed into an OFDM symbol, where the subcarriers at the edges are equal to zero. |
| 8 | IFFT: Inverse FFT is performed on N data samples to produce a baseband OFDM modulated signal. |
| 9 | Insertion of guard interval: A copy of the last $N_G$ samples of the time domain OFDM symbol are inserted before each symbol in order to reduce the effect of multipath interference. |
| 10 | Quadrature Modulator: The input signal is used to modulate carriers having a 90° phase difference. |
| 11 | Digital-to Analogue converter (D/A-converter). |
| 12 | Up-Converter: The signal is converted by a frequency converter to a given carrier frequency for transmission. |
| 13 | Radio Channel: The radio channels used for simulations are described further below in this chapter. |
| | Receiver side (lower part of FIG. 1): |
| 14 | Down-Converter: The received signal is converted from the carrier frequency down to an intermediate frequency. |
| 15 | Analogue-to-Digital converter (A/D-converter). |
| 16 | Quadrature Demodulator: The OFDM signal is detected from the intermediate frequency and the baseband signal is generated. |
| 17 | Time Synchronization: A FFT window is generated indicating the effective symbol portion of the OFDM symbol for removing the guard interval. |
| 18 | FFT: Fast (discrete) Fourier Transformation is performed on the OFDM symbol to generate the complex fequency-domain symbols. |
| 19 | Demultiplexer (DEMUX): The input signal is demultiplexed into the useful data to be sent to a phase differential decoder 21 and the unused subcarriers at the band edges are removed in 20. |
| 20 | Delete unused subcarriers: The null symbols inserted by null symbol generator 6 at the transmitter are removed and deleted. |
| 21 | Phase Differential Decoder: The phases of subsequent symbols on the same subcarrier are differentially demodulated, whereas the amplitude is coherently processed (see block diagram implementation of FIG. 5). |
| 22 | DEMUX: According to the frame structure QPSK symbols are sent to a hardlimiter 23 and a running mean amplitude generation means 24 and the following QAM symbols are amplitude-corrected in 25. |
| 23 | Hardlimiter: The received QPSK symbols are hardlimited before demodulation. |
| 24 | Running mean of amplitude: Since the amplitude of the QPSK symbols is definitely "1", the amount of amplitude distortion each subcarrier is determined from the QPSK signal, and supplied to block 25 for correction of the amplitude of the QAM symbols. |
| 25 | Correction of amplitude: The amplitude of the received QAM symbols is corrected by the factor calculated by block 24. |
| 26 | QPSK Demodulator: Demapping of QPSK complex symbols into corresponding bits. |
| 27 | 16 QAM Demodulator: Demapping of QAM complex symbols into corresponding bits. |
| 28 | MUX: Multiplexing of QPSK and QAM bits according to the adopted frame structure. |

Two channel models have been considered for simulation: An additive white Gaussian noise channel (AWGN) and a frequency selective channel model proposed by ETSI (European Telecommunications Standards Institution) for the Universal Mobile Telecommunication System (UMTS). The latter is a Wide Sense Stationary Uncorrelated Scattering (WSSUS) channel model, that assumes that the received signal is represented by the sum of six delayed replicas of the input signal, weighted by independent zero-mean complex Gaussian time variant processes. The relative path loss and delay of each path for typical indoor environment is given in the Table 1 below:

TABLE 1

Parameter of the multipath channel model used for simulations

| Tap | Relative Delay (nsec) | Average Path Loss (dB) |
|---|---|---|
| 1 | 0.0 | 0.0 |
| 2 | 50 | −3.0 |
| 3 | 110 | −10.0 |
| 4 | 170 | −18.0 |
| 5 | 290 | −26.0 |
| 6 | 310 | −32.0 |

On the receiver side the guard interval is first removed by windowing. The synchronization is not considered here. After the signal has been transformed into the frequency domain by FFT, the virtual carriers are extracted and the QAM demodulation is performed.

For the analysis the following system parameters have been used:

| | |
|---|---|
| FFT carrier size: | N = 64 |
| Guard length: | $N_G$ = 7 samples |
| Useful time: | $N_{used}$ = 64 samples |
| Symbol time: | $N_{Sym}$ = 71 samples |
| Selected carriers: | $N_{sel}$ = 56 |
| Sampling frequency: | B = 30 MHz |

Chapter II: Coherent Modulation

As mentioned above, in the case of coherent modulation pilot symbols should be inserted to help channel estimation in the receiver. Normally, each frame contains a number of pilot symbols on different subcarriers. In the receiver the amount of distortion of the pilot subcarriers is interpolated in the time and frequency domains, in order to estimate the channel response over the frequency band of interest.

Figure 2:
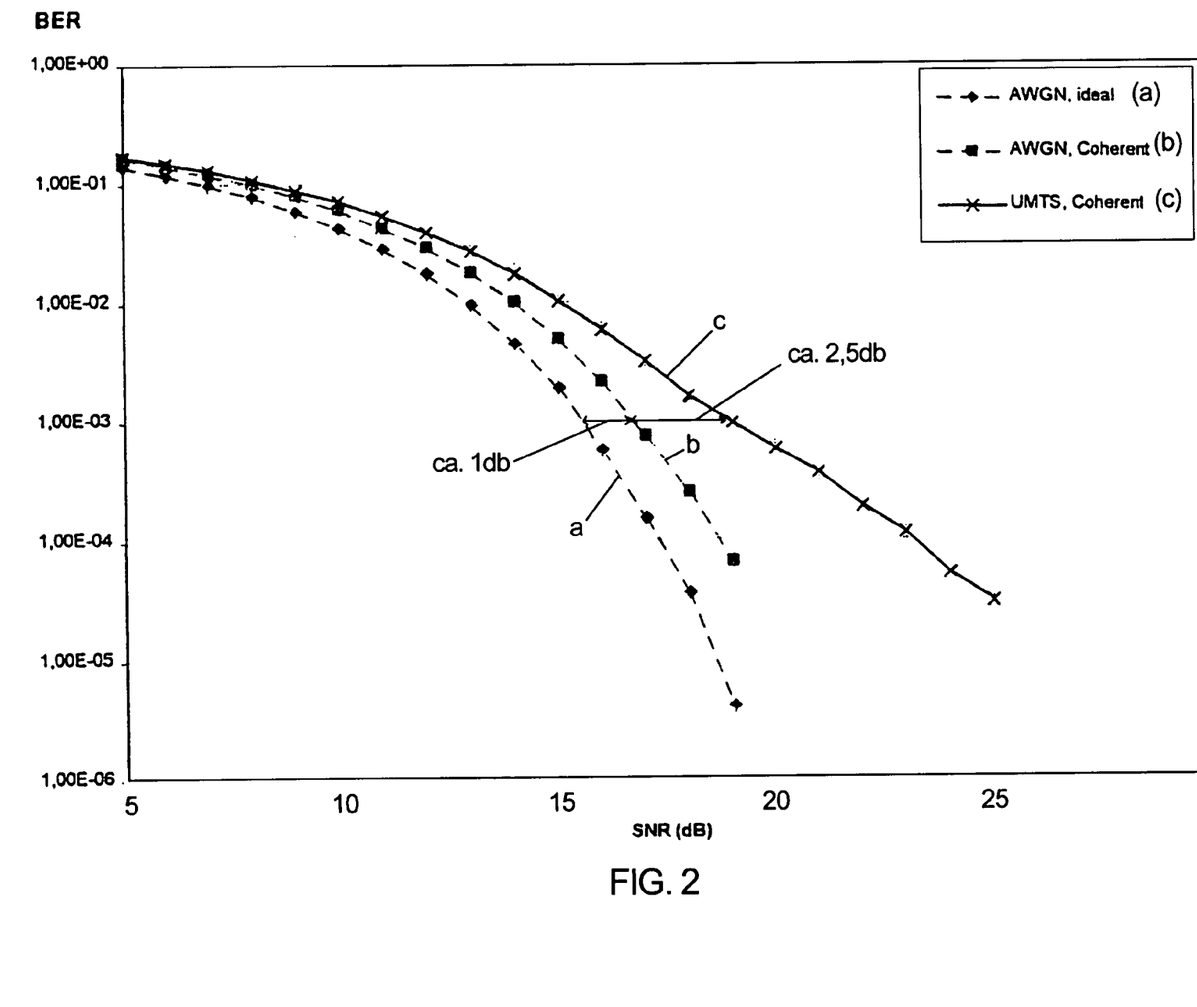
FIG. 2 is a diagram of the BER performance of coherent 16 QAM signals in an AWGN channel and multipath channel, respectively.

To simplify simulations it was assumed that one OFDM symbol with all sub-carriers set to a known value (I=1, Q=0) is sent at the beginning of each frame. On the receiver side that OFDM symbol is first filtered using a complex FIR filter, in order to shorten the effect of additive white Gaussian noise. It is then used as a measure of channel distortion and the following data symbols are correlated by equivalent factors. The simulation results over AWGN and UMTS channels are shown in FIG. 2:

Curve "a" shows an ideal demodulation condition for AWGN. Curve "b" visualizes the coherent demodulation of 16 QAM signals over an AWGN channel causing a SNR degration of about 1 dB at a BER of 10 E-3. This is due to the fact that the channel estimation factor for every subcarrier is gained from a noisy pilot symbol in spite of FIR filtering. Further SNR degration of about 2,5 dB is observed, when a multipath channel UMTS is assumed (curve "c").

These results can be improved by averaging the channel estimation factors over several frames, thus the effect of additive white Gaussian noise can be further shortened.

Chapter III: Quasi-Differential Modulation According to the Invention

The reason why quadrature amplitude modulated (QAM) signals can not be differentially processed as with DQPSK is the multi-ampliude constellation of QAM signals. The result would be endless many amplitude levels after a few symbols have been differentially modulated. This is, however, an undesired property that complicates the implementation.

Figure 3:
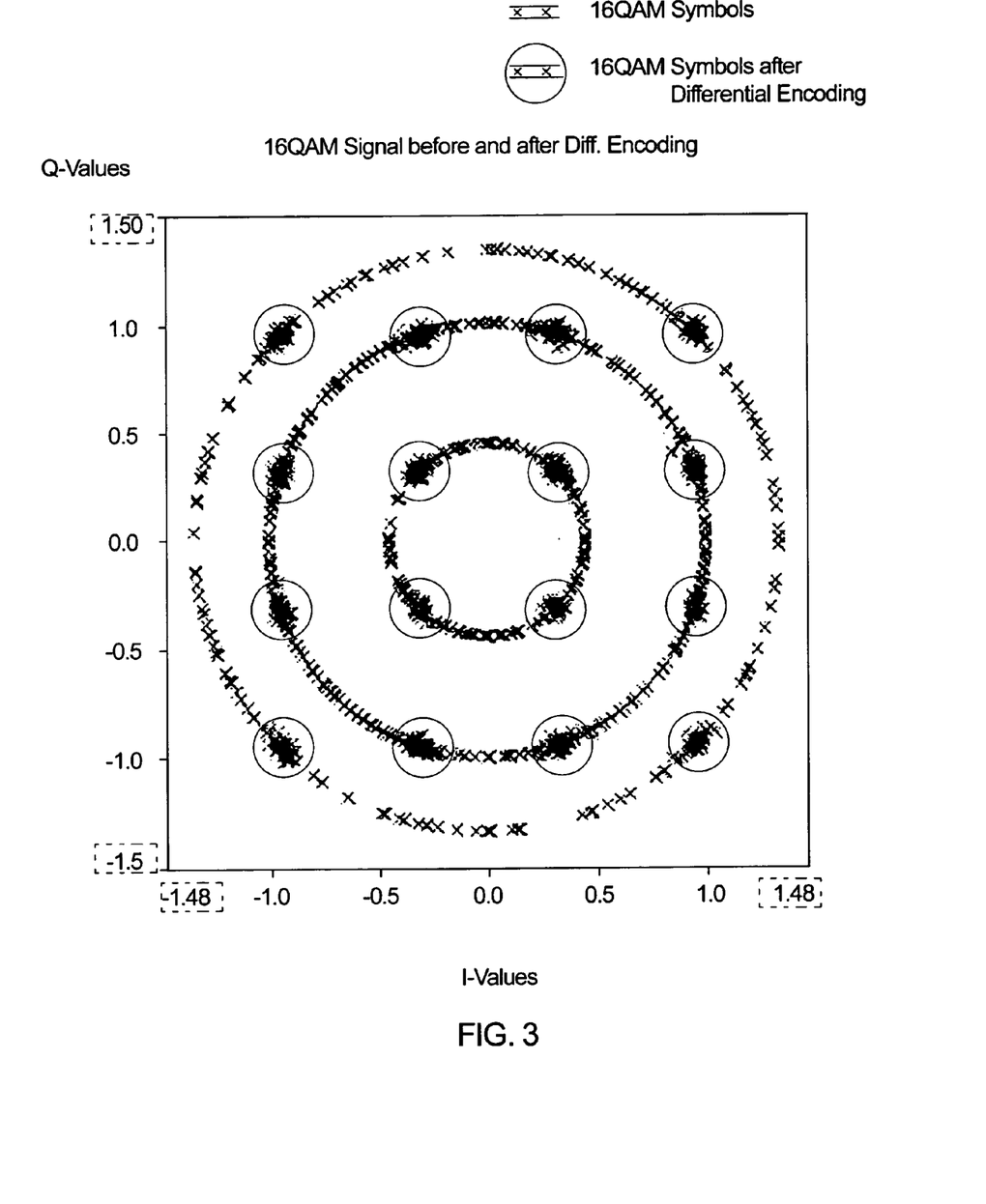
FIG. 3 is a constellation diagram of 16 QAM symbols before and after phase-differential encoding.

Thus the idea of the invention is the separate handling of amplitude and phase of QAM signals. If only the phase of 16 QAM symbols are differentially modulated while keeping their original amplitudes, there would be endless many phase levels at three amplitudes (see FIG. 3). Of course, this is less bothersome than it is the case with many amplitude levels.

Figure 4:
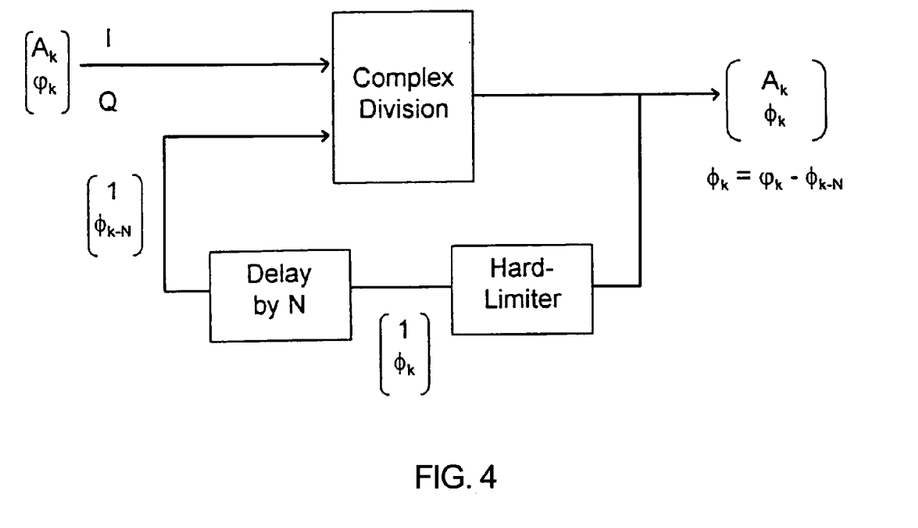
FIG. 4 depicts a block diagram implementation of a quasi-differential phase encoder (transmitter side)
Figure 5:
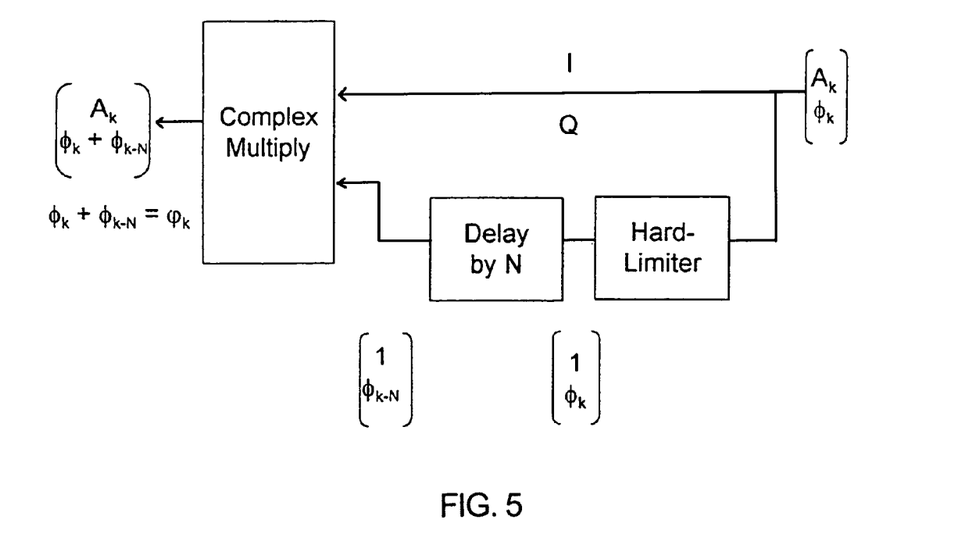
FIG. 5 is a block diagram of the implementation of a quasi-differential phase decoder (receiver side)
Figure 6:
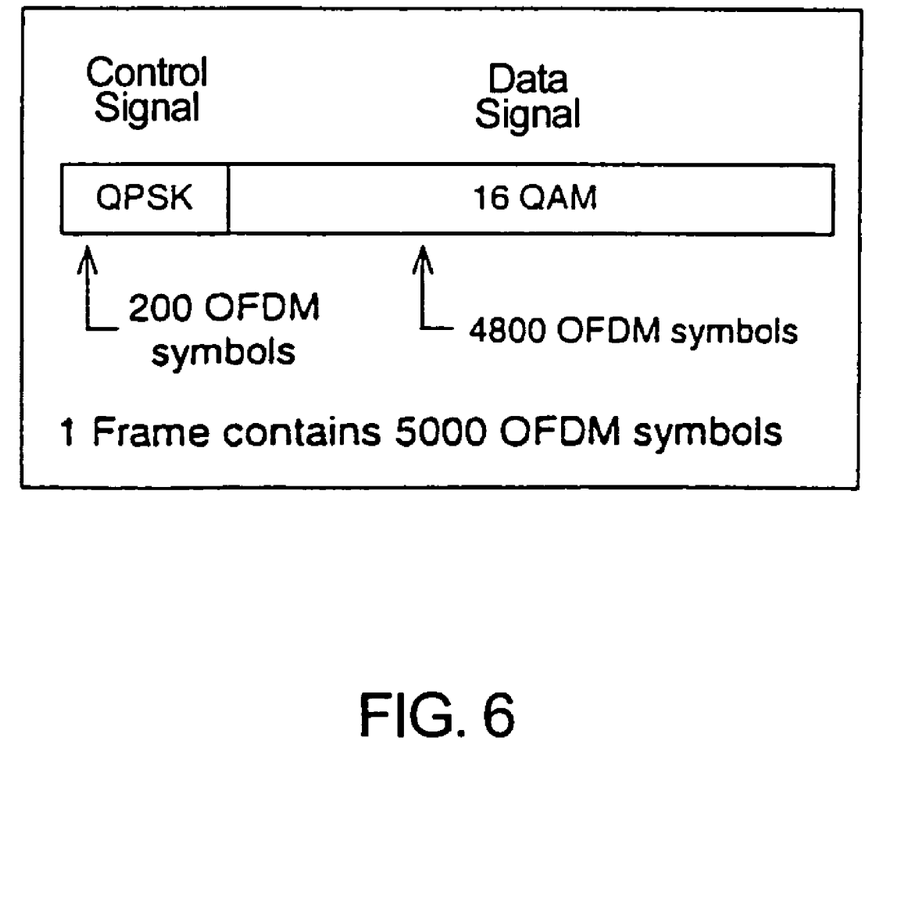
FIG. 6 shows a data frame structure as used for simulations.

As shown in FIG. 4 and FIG. 5 the phases of subsequent symbols $\phi k$ and $\phi k-N$, respectively on the same subcarrier are differentially modulated and demodulated, whereas the amplitude $A_k$ is coherently processed.

The phase rotation on every subcarrier is no more relevant. Preferably and in accordance with the invention the amplitude distortion of the QAM signal due to frequency selectivity of the channel is separately corrected. The information about the correcting factor for every subcarrier is preferably taken from the QAM symbols whose phase is unique to them. This is the case for all symbols not located at the diagonals of the Q/I diagram. In particular, this is the case for 8 of the 16 symbols as shown in the constellation digram of FIG. 10D. Constellation diagrams for QPSK and 16 QAM symbols at different stages with an assumed SNR of 35 dB are depicted in FIGS. 10A to 10F with the respective signal characterization indicated in the respective headline.

The correcting factors for the amplitude can be easier computed when a combined QPSK/16 QAM system is adopted. Often, wireless broadband systems adopt QPSK modulation of control data, for better robustness in frequency selective channels, and 16 QAM or higher modulation for useful data. In the system used for simulation, the frame structure of FIG. 6 has been adopted comprising 200 OFDM symbols in the QPSK modulated control signal and 4800 OFDM symbols in the 16 QAM modulated data signal, i.e., one frame contains 5000 OFDM symbols.

Since QPSK symbols have definitely the amplitude "1", and the channel is supposed to be static during one frame, the amount of amplitude distortion of the QPSK signal can be easily determined and used for correction of the QAM signal.

Furthermore, a running mean of the amplitude correcting factor can be performed during the QPSK transmission, in order to shorten the effect of additive white Gaussian noise.

If only 16 QAM signals are available, a running mean of the correcting factors can also be performed over a time window, where the channel is supposed to be static.

Figure 7:
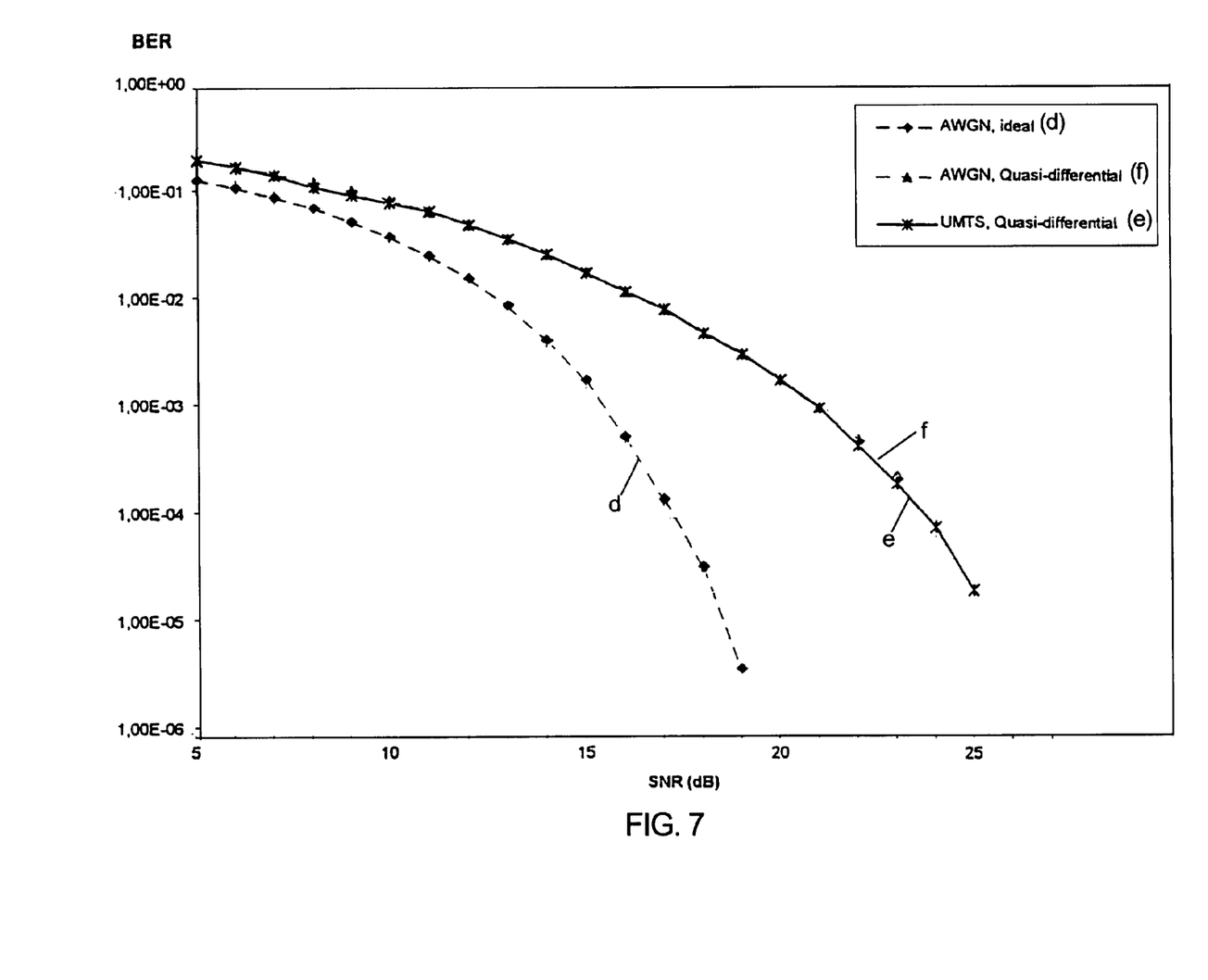
FIG. 7 is a diagram of the BER performance of quasi-differential 16 QAM signals in AWGN and multipath channels, respectively.

Quasi-differential demodulation in an AWGN channel causes a SNR degration of about 5.5 dB at a BER of 10 E-3; see FIG. 7, curve "f"—compared to curve "d" referring to an ideal AWGN channel. The BER performance over a multipath channel UMTS is identical with that over an AWGN channel as visualized by curve "e" in FIG. 7. This denotes, that the multipath effect is fully shortened with the quasi-differential demodulation technique according to the invention. The benefit of this new technique is therefore major in frequency-selective radio channels.

Chapter IV: Comparison of BER Performance

Figure 8:
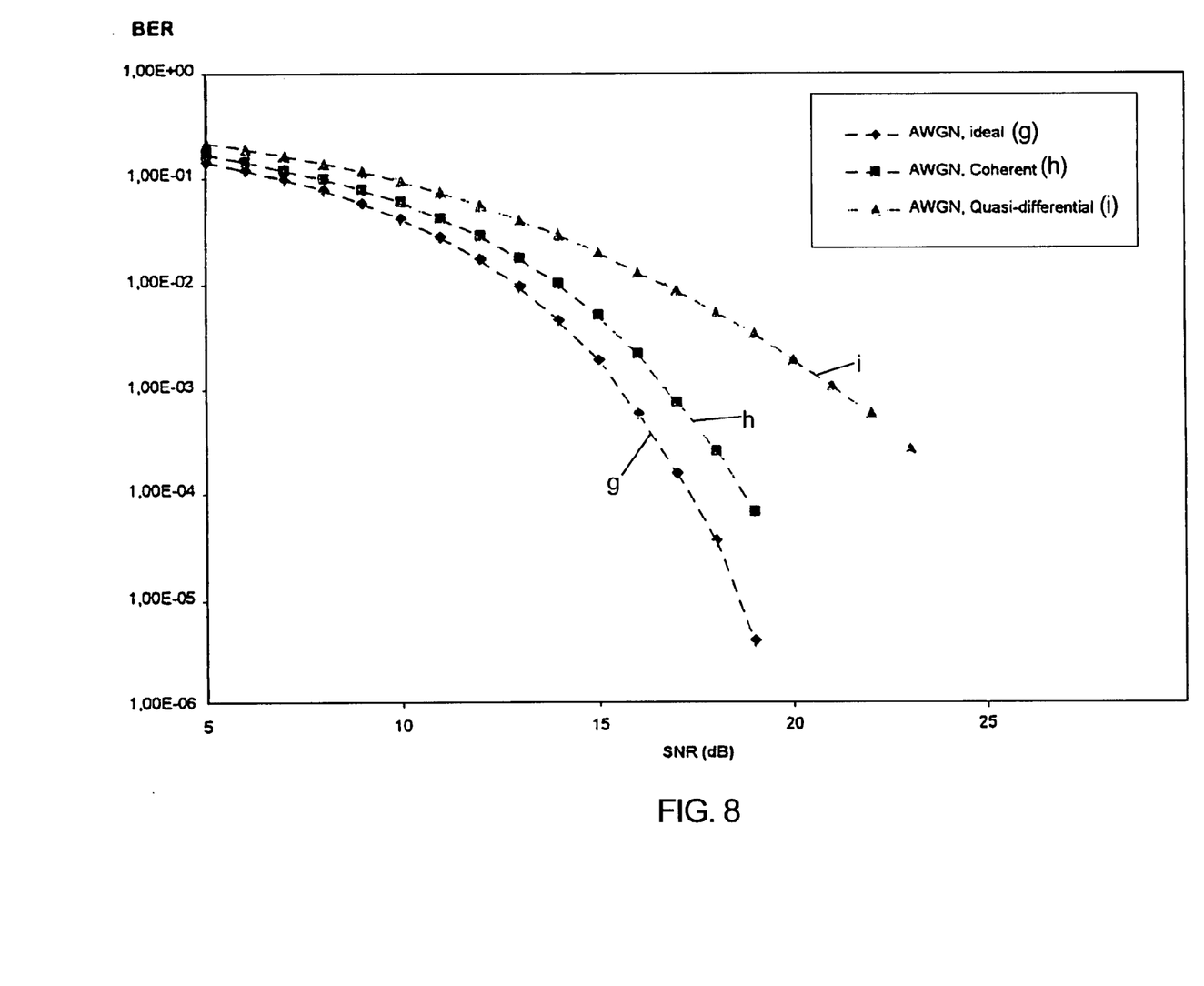
FIG. 8 visualizes a diagram of a BER performance comparison of coherent and quasi-differential 16 QAM in an AWGN channel.
Figure 9:
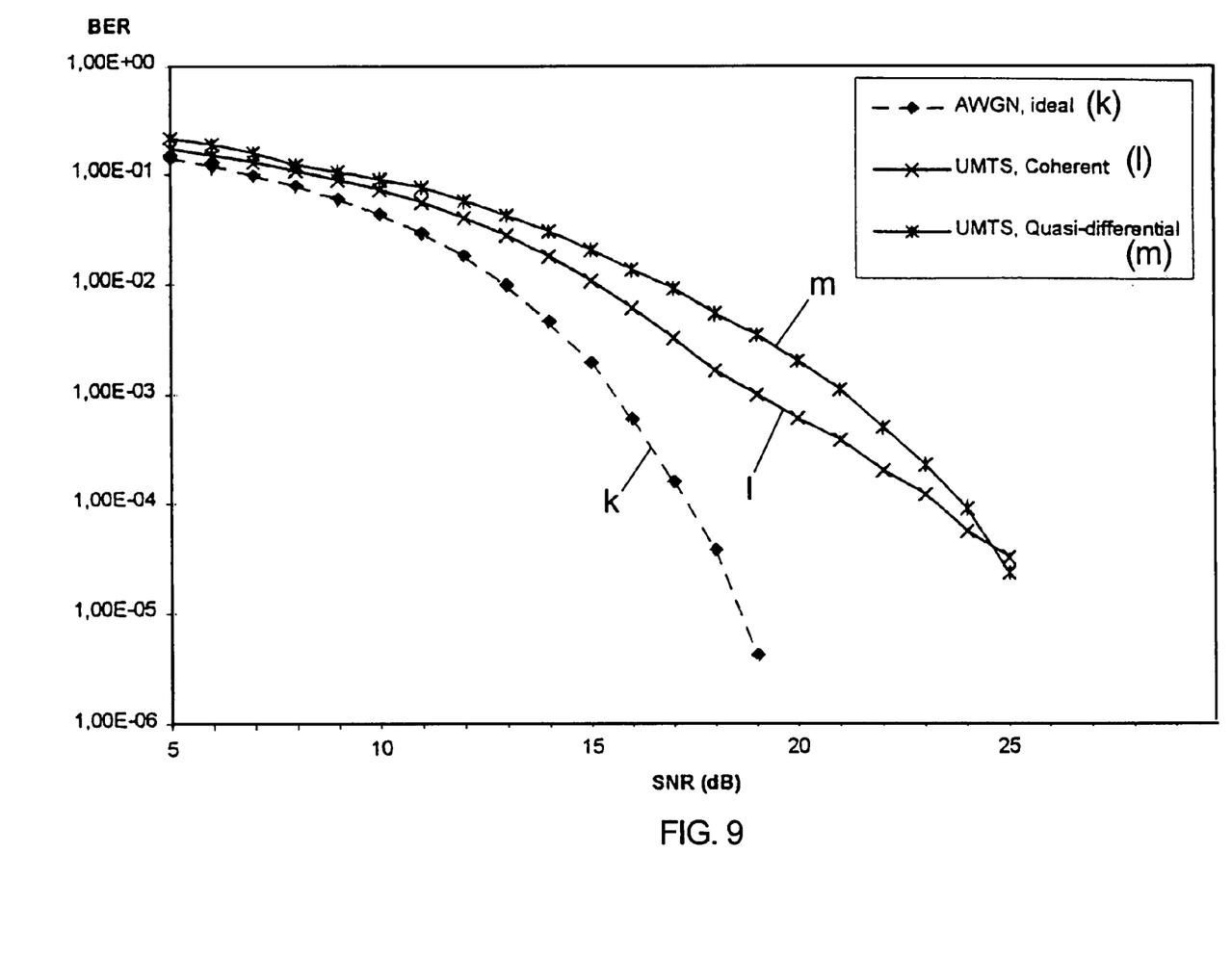
FIG. 9 is the diagram of a BER performance comparison of coherent and quasi-differential 16 QAM signals in multipath channels.
Figure 10A:
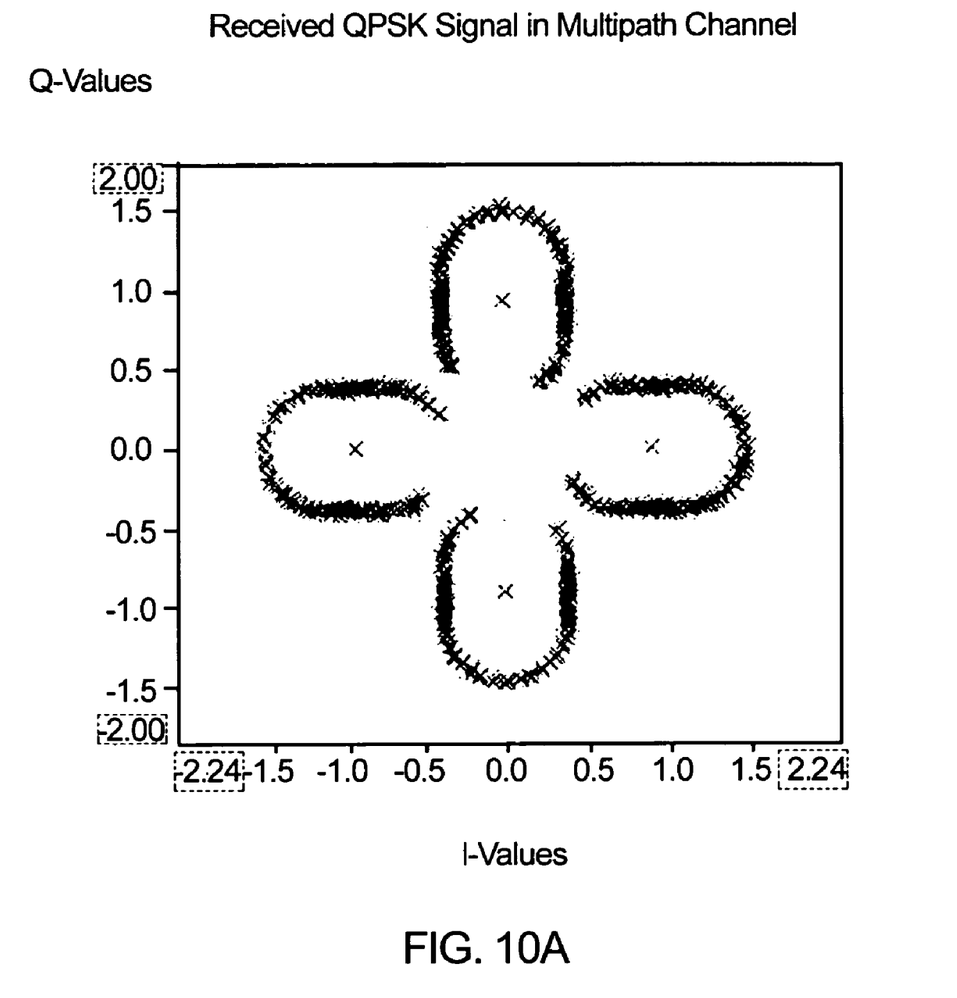
Figure 10B:
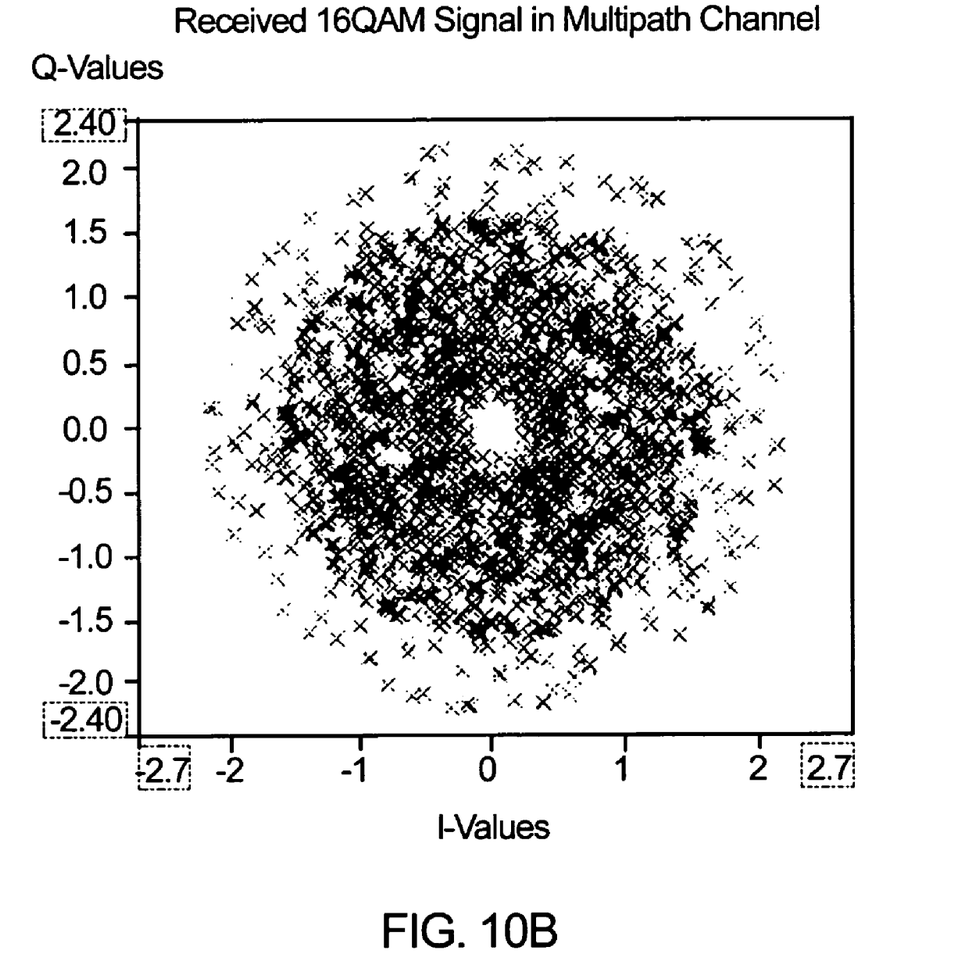
FIG. 10B is a plot of received 16 QAM signals in a multipath channel.
Figure 10C:
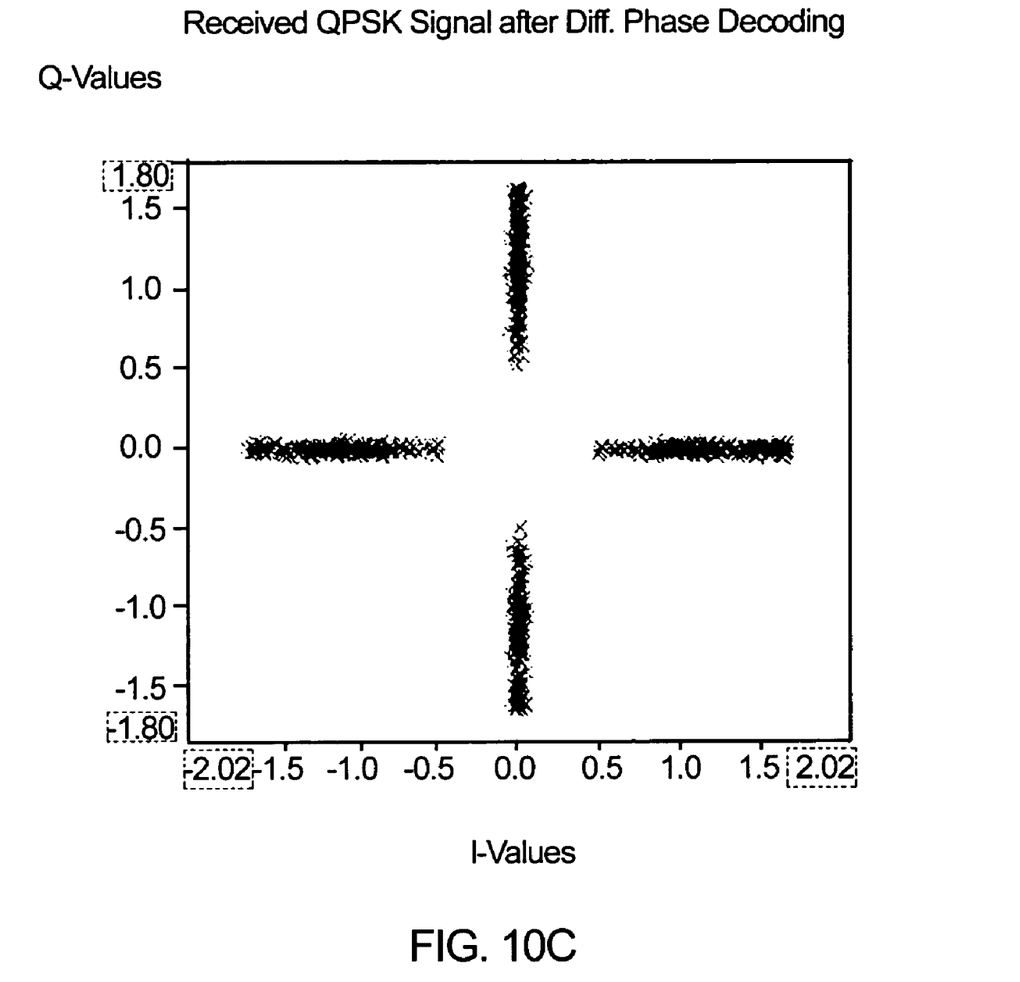
FIG. 10C shows the stage of received QPSK signals after differential phase decoding.
Figure 10D:
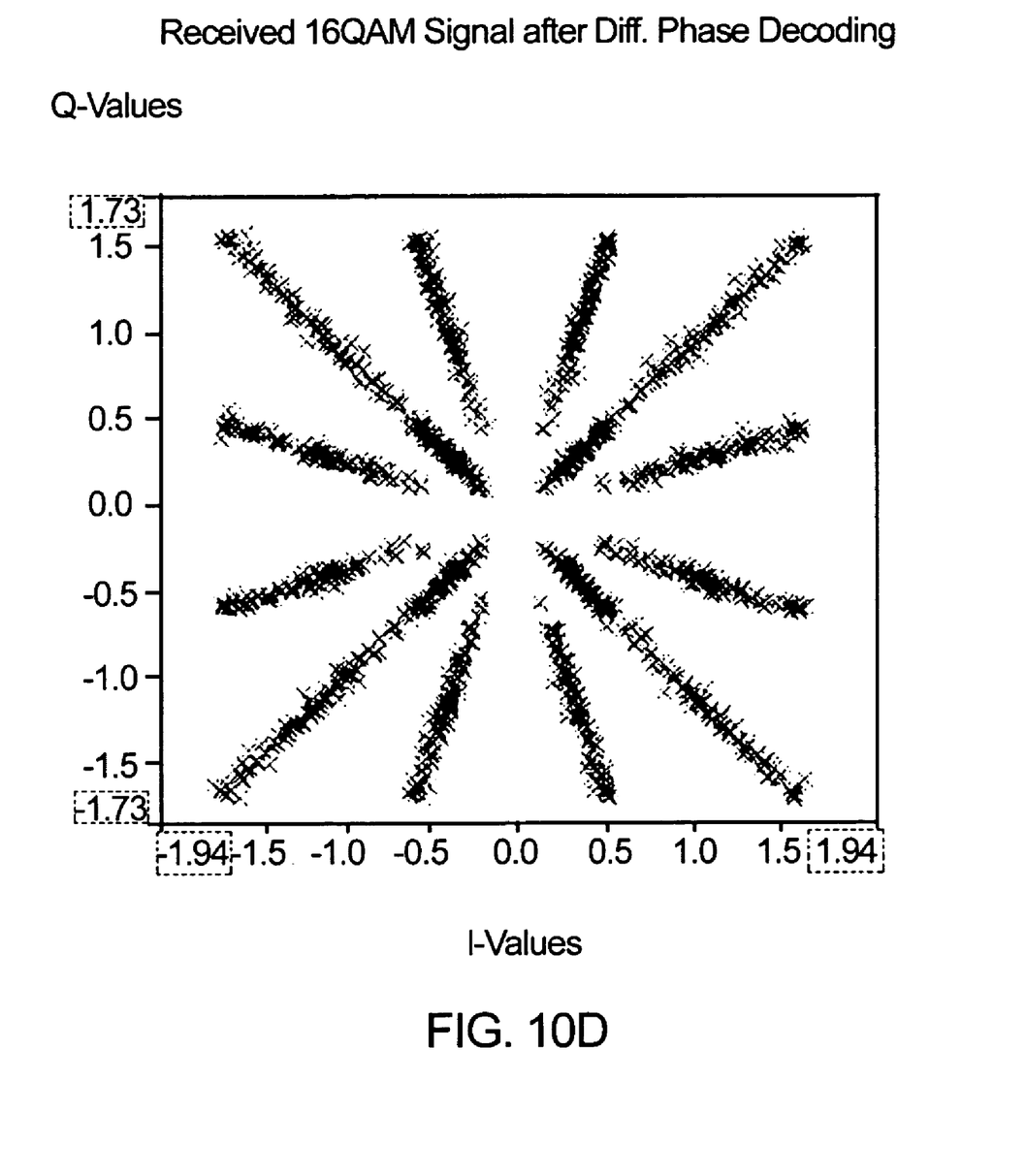
FIG. 10D is a Q/I plot of received 16 QAM signals after differential phase decoding.
Figure 10E:
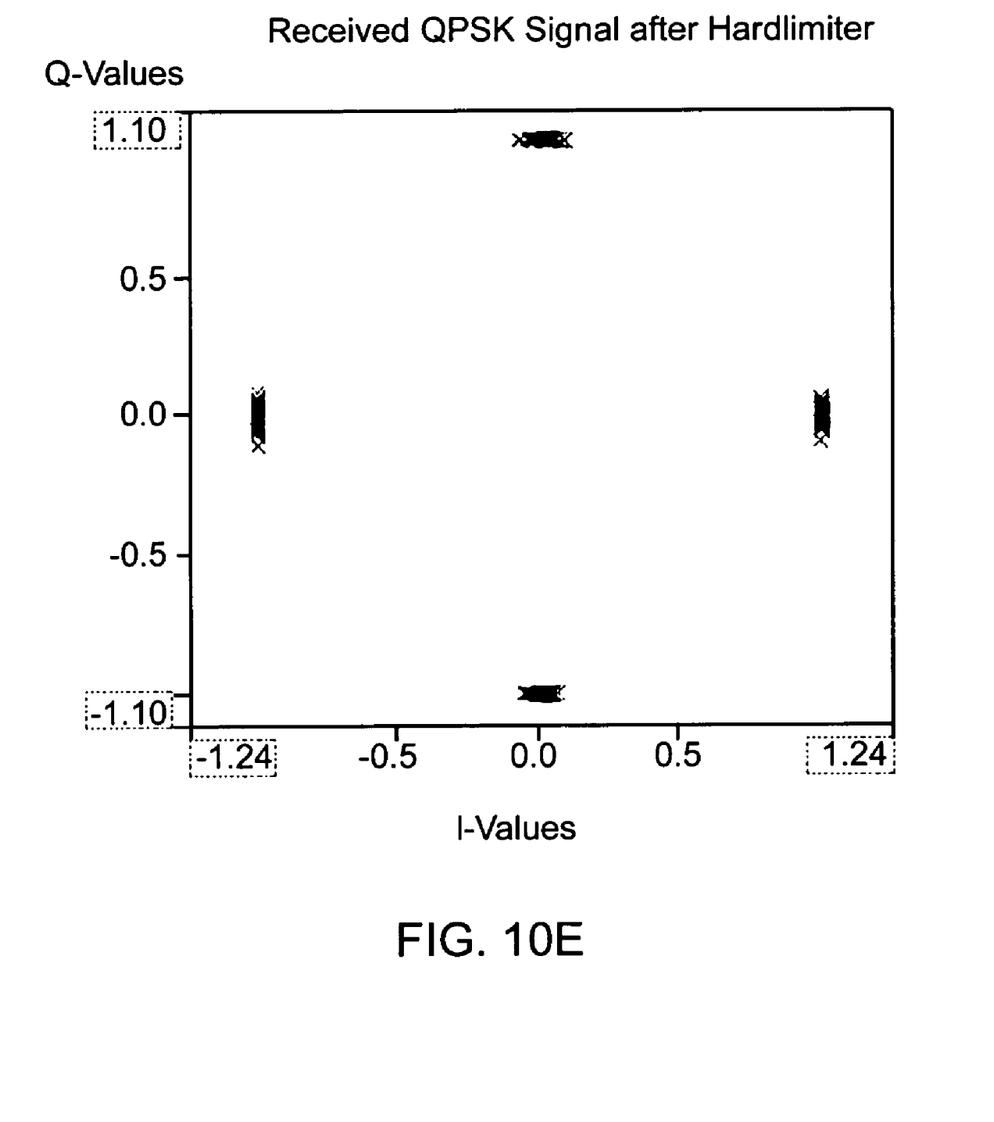
FIG. 10E depicts a plot of received QPSK signals after passing a hardlimiter on the receiver side.
Figure 10F:
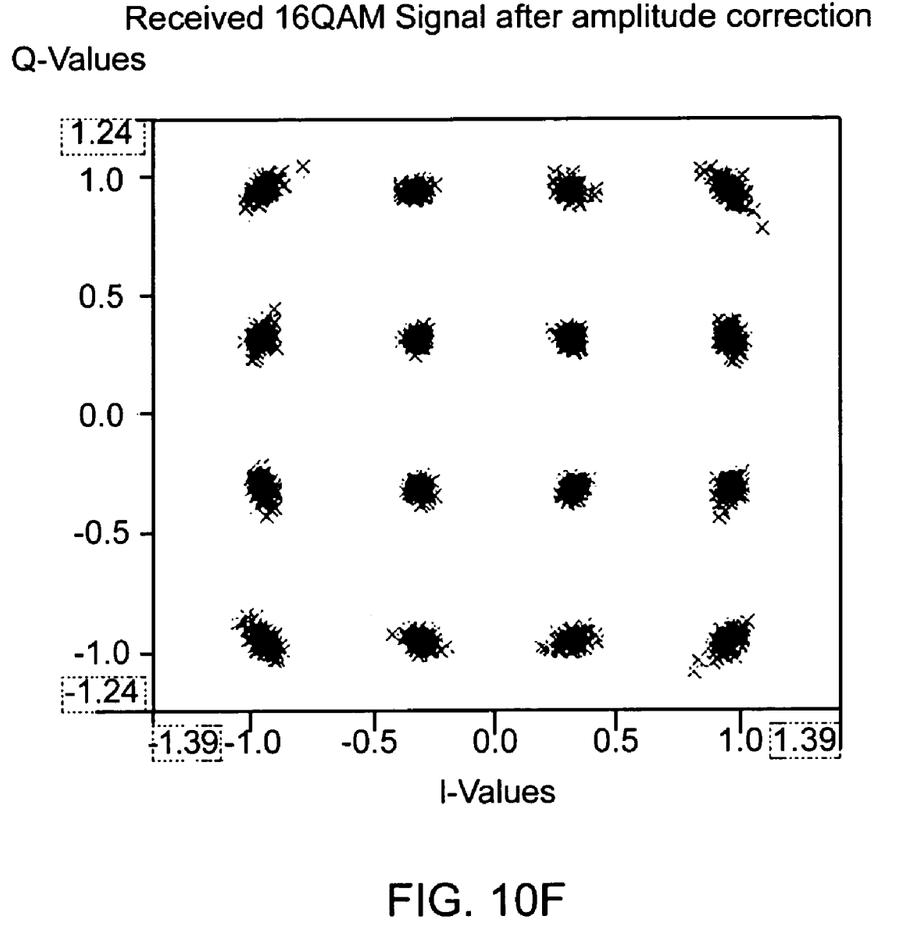
FIG. 10F represents a Q/I plot of received 16 QAM signals after amplitude correction.

The BER results of both techniques are depicted in FIG. 8 for AWGN and in FIG. 9 for the multipath channel.

FIG. 8 teaches that coherent modulation technique with channel estimation performs considerably better than the quasi-differential modulation over the AWGN channel. Curve "h" for the coherent modulation comes close to the ideal curve "g" by approximately 1 dB, whereas curve "j" for the quasi-differential technique shows a smaller decrease of BER as SNR increases.

However, the execellent performance of the 16 QAM quasi-differential modulation technique according to the invention becomes obvious when considering the multipath channel situation shown in FIG. 9. Curve "k" again shows for comparison the ideal situation for AWGN. The SNR degration of curve "m" depicting the BER performance for quasi-differential demodulation according to the invention compared to the coherent demodulation of curve "e" is most at a BER of 10 E-3, and amounts to only 2 dB. For higher and lower BERs the degration becomes constantly smaller.

Chapter V: Summary

A novel incoherent demodulation technique for QAM signals has been presented. The BER performance of this technique has been analyzed and compared to the coherent one.

It can be concluded that the advantage of the coherent demodulation is the SNR gain of maximum 2 dB at a BER of 10 E-3. However, this can be further minimized when the additional overhead for channel estimation is used for higher coding of the quasi-differential modulated signal.

Furthermore, when considering the implementation aspects of both techniques compared here, it should be noticed that the differential technique according to the invention is less complex since the frequency synchronization of differential demoluted signals is easier. In particular, complex equalizers to perform channel estimation are no more needed as for coherent systems. Also, no pilot subcarriers are needed and thus the bandwidth efficiency is much higher.

What is claimed is:

1. An orthogonal frequency division multiplexing (OFDM) system for transmission of a multi-amplitude digital modulated signal from a transmitter to a receiver via a radio channel, wherein said transmitter is adapted to process a coded data stream with a block frame structure consisting in each frame of a sequence of n quadrature phase shift keyed (QPSK) control symbols followed by m sixteen quadrature amplitude modulated (16 QAM) data symbols, where n and m are integers greater than zero, the transmitter comprising:

a demultiplexer means (1) for separating said control symbols and said data symbols, and for feeding said control signals to a QPSK modulator means (2) for mapping of two bits each into QPSK complex symbols and for supplying said data symbols to a 16 QAM modulator means (3) for mapping of four bits each into 16 QAM complex symbols, first multiplexing means (4) for multiplexing said QPSK complex symbols and said 16 QAM complex symbols and for supplying the resulting data stream to a phase differential encoder means (5) for differential modulation of the phases of respectively subsequent symbols on a same subcarrier and keeping the respective amplitudes of said symbols unchanged, second multiplexing means (7) for transferring the resulting data symbol stream into OFDM signals that are subject to an inverse fast Fourier transformation (8) to produce a baseband OFDM-modulated signal, quadrature modulator means (10) for modulating said baseband signal with carriers having 90° phase difference and supplying the thus modulated signal to D/A-converter means (11) followed by an up-converter means (11) to hook the analog D/A-converter output signal to a given carrier frequency for transmission; and wherein said receiver has differential phase decoding means (21) for demodulating said respectively subsequent symbols on said same subcarrier; and means for coherent processing of the amplitudes of said OFDM signals.

2. The OFDM system of claim 1, characterized in that null symbol generating means (6) are provided for setting unused subcarriers leaving said phase differential encoder means (5) at the band edges to zero.

3. The OFDM system of claim 1, characterized in that for reducing multipath interference effects a guard interval inserting means (9) is provided for inserting before each symbol a copy of a defined number of the last samples of the inverse fast Fourier transformed time domain OFDM symbols.

4. An orthogonal frequency division multiplexing (OFDM) system for transmission of a multi-amplitude digital modulated signal from a transmitter to a receiver via a radio channel, wherein, said receiver is adapted to receive, process and demodulate said radio channel transmitted signal, the receiver comprising:

a down-converter means (14) for converting the received signal from a carrier frequency down to an intermediate frequency;

analogue-to-digital converter means for digitizing said intermediate frequency signal;

a quadrature demodulator means (16) for detecting and generating a baseband OFDM signal from the analogue-to-digital converted intermediate frequency;

a time synchronizing means (17) for generating a window for fast Fourier transformation (FFT) indicating the effective symbol portion of the OFDM signal;

a fast discrete Fourier transformation means (18) for producing complex frequency domain symbols of said effective symbol portion of the OFDM signal;

first demultiplexer means (19) for demultiplexing the FFT transformed OFDM signal into useful data and for canceling unused subcarriers at the band edges;

phase differential decoder means (21) for demodulating the phases of subsequent symbols on the same subcarrier with simultaneous coherent processing of the amplitudes;

second demultiplexer means (22) for separating Quadrature Phase Shift Keyed (QPSK) symbols and Quadrature Amplitude Modulated (QAM) symbols;

QPSK demodulator means (26) for demapping of the QPSK symbols into corresponding bits;

QAM demodulator means (27) for demapping of the QAM symbols into corresponding bits; and third multiplexing means (28) for multiplexing of said demodulated QPSK bits and said demodulated QAM bits according to the adopted frame structure; and wherein said transmitter has phase differential encoder means (5) for differentially modulating subsequent symbols on the same subcarrier, and means for coherent processing of the amplitudes of said OFDM signals.

5. The OFDM system of claim 4, characterized in that the QPSK symbols output from said second demultiplexer means (22), on the one hand, are sent via hardlimiter means (23) to said QPSK demodulator means (26) and, on the other hand are sent to an amplitude distortion determining means for generating a running means of the respective QPSK signal, and in that the QAM symbols output by said second demultiplexer means (22) is supplied to an amplitude correction means (25) for amplitude correction according to the respective running means of amplitude before supplying the amplitude corrected QAM symbols to said QAM demodulator means (27).

* * * * *